(12) United States Patent
Treudt et al.

(10) Patent No.: US 9,752,482 B2
(45) Date of Patent: Sep. 5, 2017

(54) DEVICE FOR STORING AND DELIVERING AN AQUEOUS ADDITIVE

(71) Applicant: Kautex Textron GmbH & Co. KG, Bonn (DE)

(72) Inventors: Volker Treudt, Windeck (DE); Thomas Wagner, Kerpen (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/435,354

(22) PCT Filed: Mar. 14, 2013

(86) PCT No.: PCT/EP2013/000754
§ 371 (c)(1),
(2) Date: Apr. 13, 2015

(87) PCT Pub. No.: WO2013/152823
PCT Pub. Date: Oct. 17, 2013

(65) Prior Publication Data
US 2015/0233274 A1    Aug. 20, 2015

(30) Foreign Application Priority Data

Oct. 12, 2012  (DE) .................. 10 2012 020 040

(51) Int. Cl.
*F01N 3/00* (2006.01)
*F01N 3/20* (2006.01)
(Continued)

(52) U.S. Cl.
CPC .......... *F01N 3/2006* (2013.01); *B60K 15/073* (2013.01); *F01N 3/2066* (2013.01);
(Continued)

(58) Field of Classification Search
CPC .......... B60K 15/073; B60K 2015/0777; F01N 260/1486
See application file for complete search history.

(56) References Cited

U.S. PATENT DOCUMENTS

| 3,440,817 | A | 4/1969 | Saufferer |
| 7,497,075 | B2 | 3/2009 | Ripper et al. |
| 8,561,392 | B2 * | 10/2013 | Ogunleye ............... F01N 3/208 60/286 |

FOREIGN PATENT DOCUMENTS

| DE | 102008001020 A1 | 10/2009 |
| DE | 102010029269 A1 | 12/2011 |

(Continued)

OTHER PUBLICATIONS

English language PCT International Search Report mailed Oct. 14, 2013, received in corresponding PCT Application No. PCT/EP13/00754, 3 pgs.

(Continued)

*Primary Examiner* — Mark Laurenzi
*Assistant Examiner* — Jason Sheppard
(74) *Attorney, Agent, or Firm* — Grossman Tucker Perreault & Pfleger PLLC

(57) ABSTRACT

The invention relates to a device for storing and delivering an aqueous additive for catalytic exhaust-gas denitrogenization in a motor vehicle. The device comprises a storage vessel (1) enclosing a storage volume (2), comprises at least one delivery pump (8) for the additive, and comprises means for heating at least parts of the storage volume (2), wherein the device is characterized in that the storage vessel (1) is at least partially of double-walled form.

5 Claims, 3 Drawing Sheets

Figure 1:
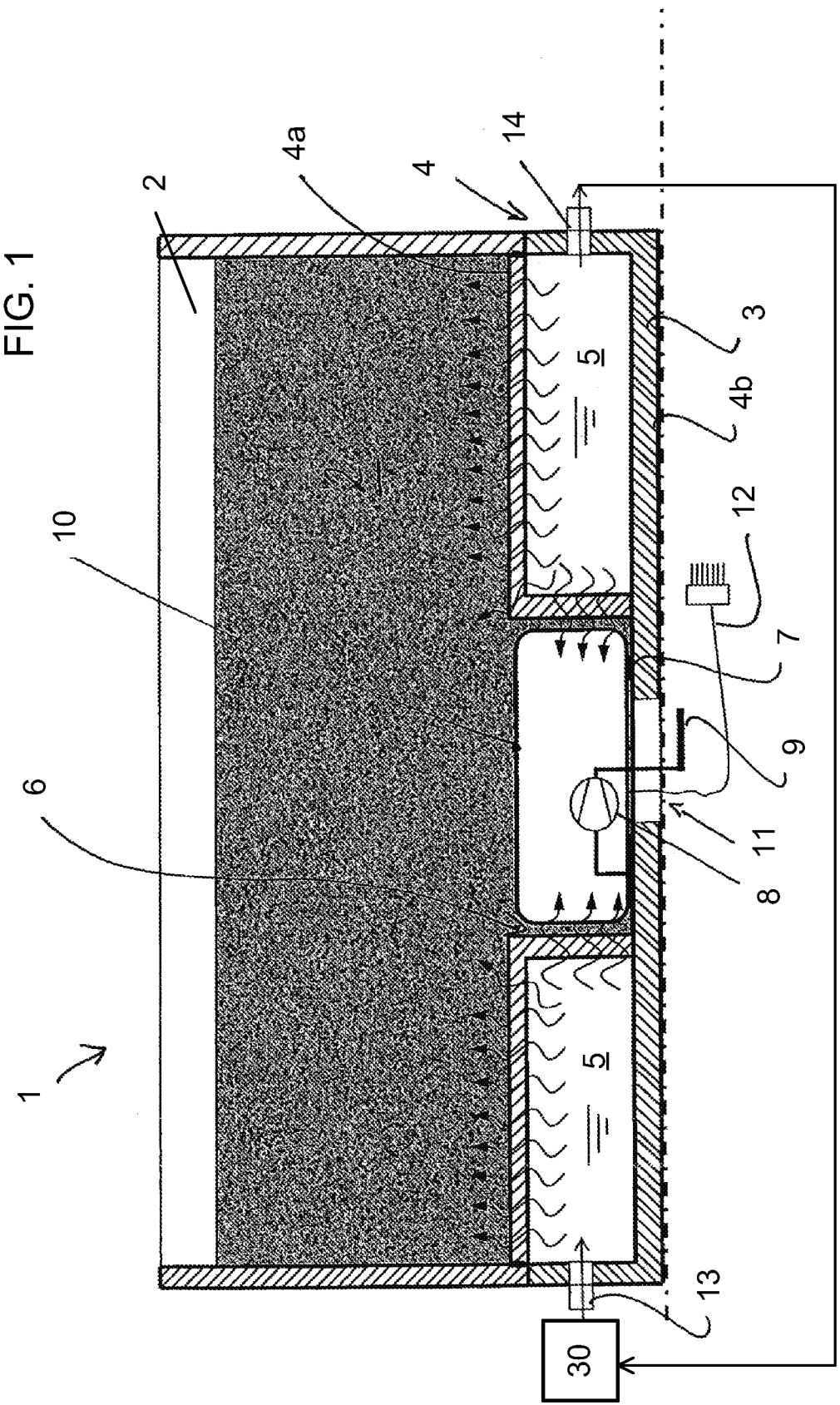

(51) Int. Cl.
*B60K 15/073* (2006.01)
*F01P 7/16* (2006.01)
(52) U.S. Cl.
CPC ............ *F01P 7/16* (2013.01); *F01N 2610/02* (2013.01); *F01N 2610/10* (2013.01); *F01N 2610/105* (2013.01); *F01N 2610/1406* (2013.01); *F01N 2610/1433* (2013.01); *F01N 2610/1486* (2013.01); *Y02T 10/24* (2013.01)

(56) References Cited

FOREIGN PATENT DOCUMENTS

| DE | 102010039087 A1 | 2/2012 |
| EP | 1473447 A1 | 11/2004 |
| EP | 1767417 A1 | 3/2007 |
| EP | 1925354 A1 | 5/2008 |

OTHER PUBLICATIONS

English language PCT International Preliminary Report on Patentability/Written Opinion issued Oct. 14, 2014, received in corresponding PCT Application No. PCT/EP13/00754, 6 pgs.

\* cited by examiner

DEVICE FOR STORING AND DELIVERING AN AQUEOUS ADDITIVE

The invention relates to a device for storing and delivering an aqueous additive, in particular for catalytic exhaust-gas denitrogenization in a motor vehicle, comprising a storage vessel which encloses a storage volume, comprising at least one delivery pump for the additive, and comprising means for heating at least parts of the storage volume or of a separate melt volume.

Such a device is known for example from EP 1 767 417 A1. EP 1 767 417 A1 relates to a tank system for providing an ice-free cold volume, such as is required by a liquid consumer after a cold start, of a urea solution for an SCR catalytic converter, said device comprising a main tank with a filler opening through which the tank interior of the main tank can be filled with operating liquid. To ensure that the operation of the liquid consumer is ensured shortly after the cold start of a motor vehicle even at ambient temperatures below the freezing point of the operating liquid, it is provided that the tank system comprises a melt device with a melt tank, wherein the melt tank is mounted as a melt tank module on the tank casing of the main tank.

In devices according to the prior art, it is basically the case that both the storage volume is heated and also a relatively small melt volume is heated in order to ensure a delivery of additive promptly after a cold start of the motor vehicle.

In particular, it is therefore known for example from EP 1 767 417 A1 to provide a relatively small melt volume in the form of a separate melt tank, but to additionally also provide heating devices in the form of electric resistance heating elements, for example, in the main volume of the storage vessel.

The electrical connection of the heating device and the arrangement of said heating device in the interior of the vessel are therefore relatively cumbersome.

Therefore, the invention is based on the object of providing a device of the type mentioned in the introduction which permits particularly dependable and reliable melting and/or heating of the additive in the event of a freezing point being undershot or in the case of low ambient temperatures and which is structurally of particularly simple design.

The object is achieved by means of a device for storing and delivering an aqueous additive, in particular for catalytic exhaust-gas denitrogenization in a motor vehicle, comprising a storage vessel which encloses a storage volume, comprising at least one delivery pump for the additive, and comprising means for heating at least parts of the storage volume or of a separate melt volume, wherein the device according to the invention is characterized in that the storage vessel is at least partially of double-walled form. In this way, firstly, a certain insulation effect is attained, and secondly, an additional volume is generated which may comprise for example a latent heat accumulator or a heating fluid. Particularly effective and inexpensive heating of the storage volume is possible in this way.

In a particularly preferred variant of the device according to the invention, it may be provided that the storage vessel has at least one casing volume which can be traversed by a flow of a heat carrier medium and which is provided with a feed port and at least one return port for a heat carrier medium.

It is provided according to the invention that the volume which can be traversed by a flow of the heat carrier medium is formed by the double-walled configuration of the storage vessel. The storage vessel may be of double-walled form in parts of its perimeter wall and/or of the bottom, for example, and/or may be entirely of double-walled form.

In one expedient and preferred variant of the storage vessel, it is provided that the latter has at least a double-walled bottom which forms a volume which can be traversed by a flow of a heat carrier medium.

The volume which can be traversed by a flow of the heat carrier medium may for example comprise a plurality of ducts which can selectively be traversed individually or jointly by a flow of the heat carrier medium and which, in the bottom and/or in the wall of the storage vessel, define different heating zones which can be selectively activated or charged with a heat carrier medium for example depending on the operating state of the vehicle or of the internal combustion engine.

In a particularly advantageous variant of the device according to the invention, it is provided that the ducts at least partially surround a centrally arranged delivery sump in the bottom of the storage vessel. By means of an arrangement of said type, it is ensured that a molten partial volume of additive is initially available in the direct vicinity of the suction region of the delivery pump promptly after a cold start of the vehicle, such that additive can be extracted from the storage vessel already after a short time delay following a start of operation of the internal combustion engine.

In an expedient embodiment of the device of the invention, it is provided that the ducts are arranged in concentric or spiral form around the delivery sump. The delivery sump and the bottom of the vessel may have any desired outline geometry.

It is for example possible for a first, inner duct to communicate with the feed port and for at least one second, outer duct to be connected to a return path of the first duct.

The invention should self-evidently be understood as meaning that more than two ducts may be provided which can selectively be charged individually or in groups with a heat carrier medium and which define different heating zones on the storage vessel.

For example, if the volume which can be traversed by a flow of the heat carrier is connected to the cooling circuit of an internal combustion engine, an activation of ducts in the sense of an increase of the volume to be heated or traversed by flow can be performed as a function of the operating temperature of the internal combustion engine.

For example, the second duct may be connected to the first duct via a thermostat valve, such that an enlargement of the volume which can be traversed by a flow of the heat carrier medium is possible when a certain operating temperature is reached.

Figure 2:
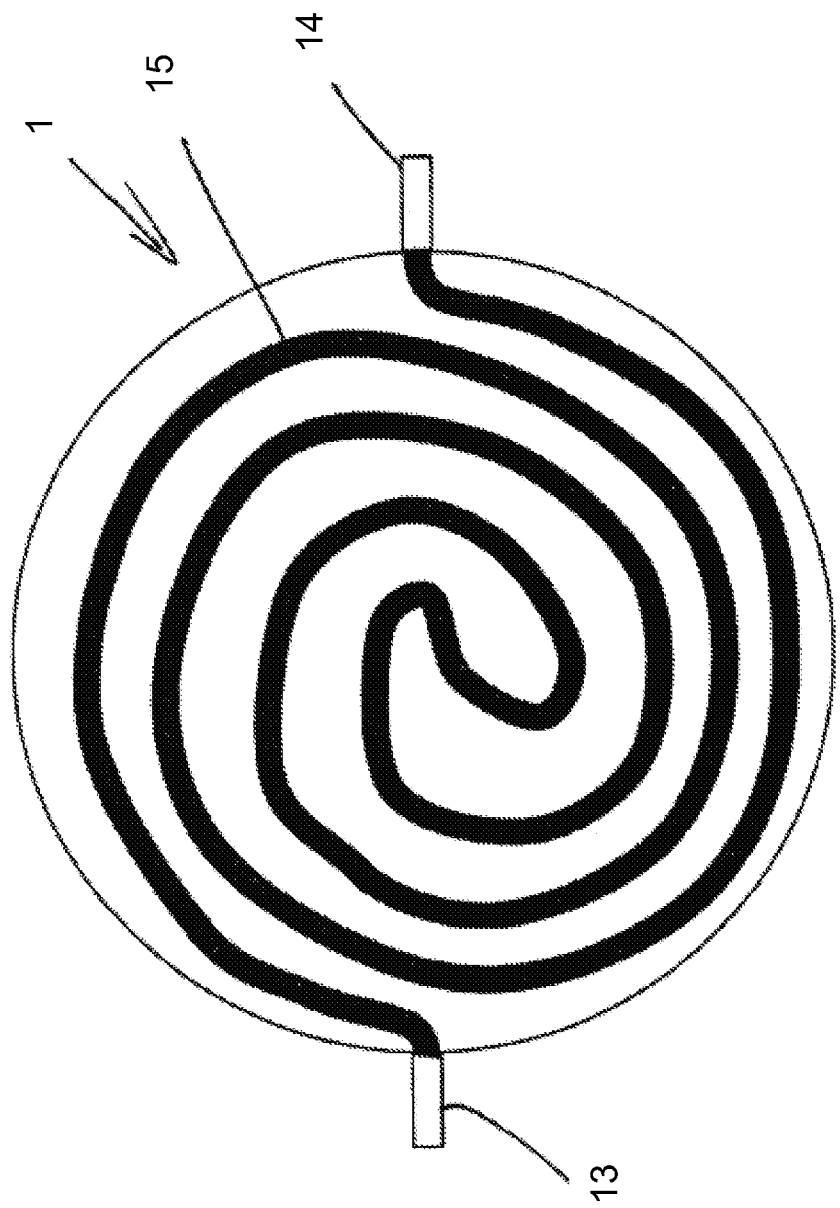
Figure 3:
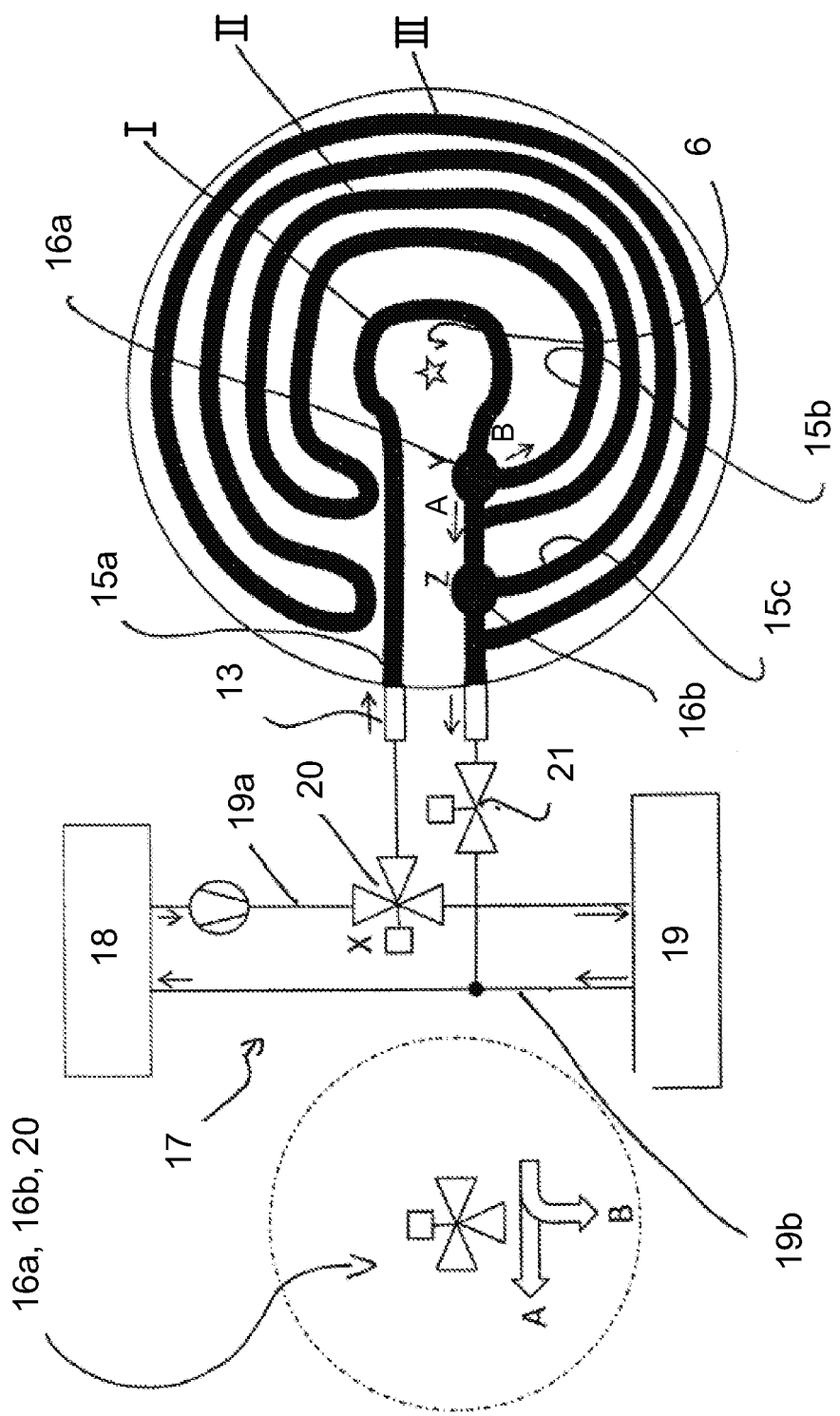

The invention will be explained in more detail below on the basis of an exemplary embodiment illustrated in the drawings, in which:

FIG. 1 is a schematic sectional illustration through a device according to the invention, FIG. 2 is a simplified illustration of the bottom of the storage vessel of the device according to the invention as per a first variant, and FIG. 3 is a schematic illustration of the vessel bottom of a second variant of the device according to the invention with a diagrammatic illustration of the hydraulic layout of the heat carrier circuit.

Reference is made firstly to FIG. 1, which shows one possible variant of the device according to the invention.

Said device comprises a storage vessel 1 which encloses a storage volume 2. The storage vessel 1 is composed for example of thermoplastic material and is assembled from injection-molded half-shells, wherein the illustration of FIG.

1 shows only that half-shell which is situated at the bottom side in the installed position. Said half-shell is in turn of multi-part form and comprises a base 3 which is welded to the storage vessel 1 and which forms a double bottom 4 of the storage vessel 1, in such a way that a further volume 5 which can be traversed by a flow of a heat carrier medium is formed between the storage volume 2 and the base 3.

As an alternative to said embodiment of the storage vessel 1, it may for example be provided that the storage vessel 1 is entirely of double-walled form or that parts of the perimeter wall of the storage vessel 1 are of double-walled form. This may be realized for example by virtue of a plurality of vessel shells or entire vessels being placed one inside the other with the interposition of spacers.

In the variant of the storage vessel 1 as per FIG. 1, said storage vessel comprises an inner bottom 4a, which directly delimits the storage volume 2, and an outer bottom 4b, which is formed by the base 3. The inner bottom 4a comprises a depression 6 which forms a pump sump and in which a delivery pump module 7 is inserted. The depression of the inner bottom 4a forms the lowest point of the storage volume 2 in the installed position thereof, from which point the delivery pump module 7 or a delivery pump 8 arranged therein delivers additive from the storage volume 2 to the exhaust system of a diesel motor vehicle via a dosing line 9. For example, the delivery pump module 7 itself may define an additional melt volume and be provided with an electrical heating device for said additional melt volume.

The delivery pump volume 7 preferably furthermore comprises a module housing 10 which, within the depression 6, may be welded to the outer bottom 4b of the storage vessel 1 and may be arranged above a leadthrough opening 11 in the outer bottom 4b.

The delivery pump module 7 and the heating device (not illustrated) arranged within the delivery pump module 7 are supplied with voltage via an electrical supply line 12. The dosing line 9 and the electrical supply line 12 are led out of the module housing 10 and out of the storage vessel 1 through the leadthrough opening 11.

The volume 5 is formed in the manner of a duct surrounding the depression 6, which duct is provided with a feed port 13 and a return port 14 for a heat carrier medium. Said arrangement ensures a flow around the depression 6 such that the depression or the delivery sump formed by the depression 6 is surrounded by the volume 5 such that a transfer of heat from the heat carrier medium through the inner bottom 4a to the additive situated in the depression 6 takes place, and a small partial volume of additive is heated and melted there first. The feed port 13 is connected to the coolant circuit of an internal combustion engine 30 at the feed path side, and the return port 14 is likewise connected to the coolant circuit of the internal combustion engine 30, such that during operation of the motor vehicle, the heat carrier medium charged with heat from the internal combustion engine 30 flows through the volume 5. The heat carrier medium in turn releases its heat load to the additive stored within the storage volume 2. In this way, effective and simple heating of the storage volume is possible after the internal combustion engine 30 has been running for a relatively short time.

The storage vessel 1 may have a bottom surface which may be of any desired geometrical form. In the described exemplary embodiment, the storage vessel 1 has an approximately circular bottom surface, which should not be regarded as restricting the invention.

The duct 15 formed by the volume 5 may for example have the spiral-shaped profile illustrated in FIG. 2. Alternatively, the volume 5 may be formed by first, second and third ducts 15a, 15b, 15c (see FIG. 3) which form a total of three heating zones I, II, III within the double bottom 4 of the storage vessel 1. The ducts 15a, 15b, 15c surround the centrally provided depression 6, within which the delivery pump module 7 is arranged.

The inner duct denoted by 15a directly surrounds the depression 6, or directly adjoins the edge of the depression 6. A second, outer duct 15b is connected to the return path of the first, inner duct 15a, and to the return path of said second, outer duct there is connected, in turn, a third, outer duct 15c. The second, outer duct 15b is connected to the return path of the first, inner duct 15a via a thermostat valve 16a, and a second thermostat valve 16b is connected to the return path of the second, outer duct 15b.

The cooling circuit 17 of an internal combustion engine is schematically illustrated in FIG. 3. Said cooling circuit comprises a heat exchanger 19 with a feed path 19a and a return path 19b. To the feed path 19a of the heat exchanger 19 from the internal combustion engine 18 to the heat exchanger 19 there is connected a thermostat valve 20 which communicates with the feed port 13 of the first, inner duct 15a, and in the return path 19b from the heat exchanger 19 to the internal combustion engine 18 there is provided a switching valve 21 which communicates with the return port 14 of the ducts 15a, 15b, 15c.

When the internal combustion engine 18 has reached a certain predefined operating temperature, the thermostat valve 20 opens and supplies heated cooling liquid to the first, inner duct 15a, which heated cooling liquid flows through said first, inner duct and, when the switching valve 21 is open, is fed back into the return path 19b between the heat exchangers 19 and the internal combustion engine 18. The first, inner duct 15a defines an inner heating zone I. If the operating temperature of the internal combustion engine rises further, the thermostat valve 16a opens, such that the second, outer duct 15b, which defines a second, outer heating zone II, is activated. In the event of a further increase in the operating temperature of the internal combustion engine 18 or of the heat exchanger medium, it is possible, if appropriate, for the second thermostat valve 16b to open, such that the second, outer duct 15c, which defines a third, outer heating zone III, is activated. During the course of the thawing process, the heating zones I to III are opened in a sequence beginning firstly with I, followed by II and finally III by means of the thermostat valves 16a and 16b, such that the available heating power is initially concentrated in the direct vicinity of the depression 6 and in the delivery sump. The power is subsequently diverted, by activation of the heating zones II and III, into the periphery of the storage vessel 1. In this way, the storage vessel 1 is thawed from the inside to the outside, wherein the thermostat valves in each case have distinct operating temperatures which increase in the abovementioned sequence.

LIST OF REFERENCE SYMBOLS

1 Storage vessel
2 Storage volume
3 Base
4 Double bottom
4a Inner bottom
4b Outer bottom
5 Volume
6 Depression
7 Delivery pump module
8 Delivery pump 9 Dosing line
10 Module housing
11 Leadthrough opening
12 Electrical supply
13 Feed port
14 Return port
15 Duct
15a First, inner duct
15b Second, outer duct
15c Third, outer duct
16a First thermostat valve
16b Second thermostat valve
17 Cooling circuit
18 Internal combustion engine
19 Heat exchanger
19a Feed path, cooling circuit
19b Return path, cooling circuit
20 Thermostat valve
21 Switching valve
I Inner heating zone
II Second, outer heating zone
III Third, outer heating zone

The invention claimed is:

1. A device for storing and delivering an aqueous additive, in particular for catalytic exhaust-gas denitrogenization in a motor vehicle, comprising:
 a storage vessel which encloses a storage volume and an optional additional melt volume,
 at least one delivery pump for the additive,
 a heating device configured to heat at least parts of the storage volume and the optional additional melt volume, and
 a heating volume which is transversable by a flow of a heat carrier medium comprising a plurality of ducts which are selectively transversable individually or jointly by the flow of the heat carrier medium and which, in a bottom and/or in a wall of the storage vessel, define different heating zones;
 wherein the storage vessel is at least partially of double-walled form.

2. The device as claimed in claim 1, wherein the ducts at least partially surround a centrally arranged delivery sump in the bottom of the storage vessel.

3. The device as claimed in claim 1, wherein the ducts are arranged in concentric or spiral form around the delivery sump.

4. The device as claimed in claim 1, wherein the plurality of ducts include a first, inner duct that communicates with the feed port and in that there is at least one second, outer duct that is connected to a return path of the first duct.

5. The device as claimed in claim 4, wherein the second duct is connected to the first duct via a thermostat valve.

* * * * *